Feb. 8, 1949.    W. A. GREENE    2,461,269
DRAWBAR CONSTRUCTION FOR TRACTORS
Filed Dec. 14, 1945

INVENTOR:
William A. Greene
BY Owen W. Kennedy
ATTORNEY

Patented Feb. 8, 1949

2,461,269

UNITED STATES PATENT OFFICE 2,461,269

DRAWBAR CONSTRUCTION FOR TRACTORS

William A. Greene, Oxford, Mass.

Application December 14, 1945, Serial No. 634,984

3 Claims. (Cl. 280—33.44)

The present invention relates to an improved drawbar construction for use in connection with farm tractors to pull various types of farm implements and vehicles.

The main object of the invention is to provide a drawbar device that is simple and inexpensive in construction and, in addition, is readily applicable to a particular type of farm tractor already in extensive use, without necessitating any changes in the tractor draft mechanism. Furthermore, the drawbar of the present invention is so constructed as to apply the load at a point close to and beside the housing of the tractor's rear axle, so that there is no tendency, when pulling heavy loads, for the tractor to raise up at its front end, as sometimes happens when a load is applied at a considerable distance from and behind the rear axle. The above and other advantageous features of the invention will hereinafter more fully appear from the following description, considered in connection with the accompanying drawings, in which:

Figure 1:
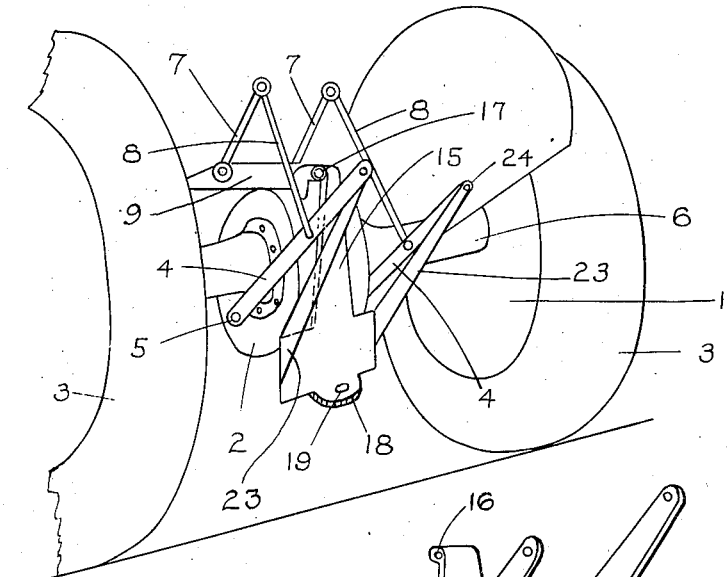
Fig. 1 is a perspective view illustrating the drawbar of the present invention attached to the rear end of a well known type of farm tractor.

As previously pointed out, the present invention relates to a drawbar construction which is particularly adapted for use in association with a farm tractor of a well known type provided with a draft mechanism for the attachment of specially designed farm implements. This tractor draft mechanism is of the type generally shown and described in Ferguson Patent No. 2,118,180, and essential elements thereof are shown in the drawings as an illustrative embodiment of the manner in which my improved drawbar may be readily attached to such a draft mechanism.

Referring first to Fig. 1, the rear end of a tractor is indicated at 1, with a differential housing 2 extending between the wheels 3. The above mentioned draft mechanism of the Ferguson patent consists essentially of a pair of rearwardly extending draft arms 4, pivotally mounted at 5 on opposite sides of the housing 2 and beneath the rear axle 6, which is shown in section in Fig. 2.

The housing 2 has also associated therewith a pair of hydraulically controlled lift arms 7, which are pivotally connected by links 8 to the draft arms 4. The lift arms 7 are adapted to be turned about their pivots by a hydraulically controlled mechanism, which forms no part of the present invention, so as to raise or lower the draft arms 4. The hydraulic operating means is indicated at 9 in association with the lift arms 7, and 10 designates a manual control handle which is effective on the hydraulic control 9 when moved by the operator to adjust the position of the draft arms 4 about their pivots 5, the arms 4 being shown in their extreme raised position in Fig. 2.

The housing 2 also provides a lug 11 for the pivotal support of a pair of crank levers 12 associated with a control spring 13 cooperating with a thrust link, not shown, when the draft mechanism of the tractor is used in connection with certain special types of farm implements such as plows. The construction described thus far corresponds in general to that disclosed in the aforesaid Ferguson patent, and the present invention provides a specially constructed drawbar for use therewith. This drawbar is for use in connection with various types of agricultural vehicles or implements, without requiring any special structure or attachments to such vehicles or implements, with the drawbar serving to apply the load of such vehicles or implements to the existing draft mechanism of the tractor.

As best shown in Fig. 1, the drawbar of the present invention is indicated at 14 as consisting of a heavy plate, the upper edge of which provides an arm 15 terminating in a lug 16 which is received between the forward ends of the levers 12 and connected thereto by a pin 17. The lower edge of the drawbar 14 provides a foot 18 extending at right angles and provided with an opening 19 for receiving the pin or draw bolt 20 of the usual clevis or coupling member 21, carried by the draft tongue 22 of the vehicle or implement which is to be drawn, see Fig. 2.

Figure 4:
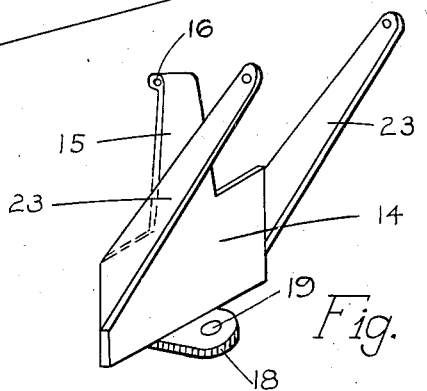
Fig. 4 is a perspective view of the drawbar removed from the tractor.
Figure 2:
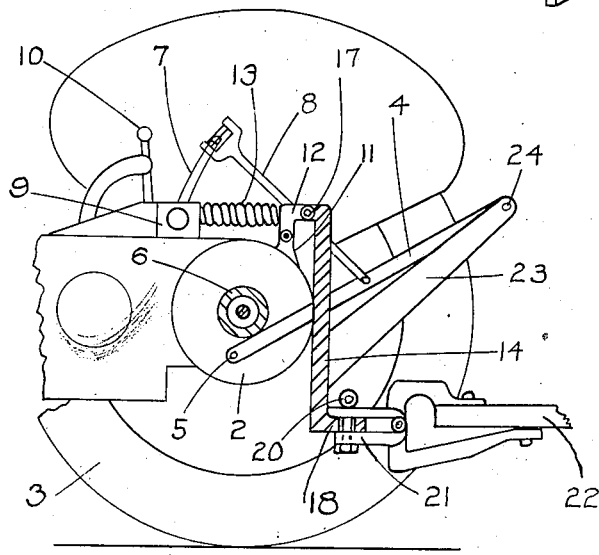
Fig. 2 is a fragmentary view, partially in section and partially in side elevation, illustrating structural details of the drawbar and the associated tractor mechanism, with the draft tongue of a vehicle coupled to the drawbar.
Figure 3:
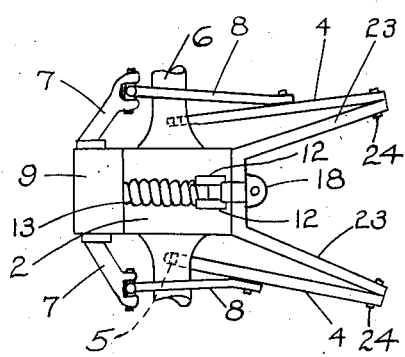
Fig. 3 is a fragmentary plan view of the drawbar, with the connections shown in Fig. 2.

The drawbar 14 also provides a pair of rearwardly extending braces 23 that are pivotally connected at their ends to the draft arms 4 of the tractor mechanism by means of pins 24. These braces 23 are rigid with the drawbar 14 and extend upwardly at an angle to the arms 4, as shown in Fig. 2, while diverging outwardly away from the point of draft, as viewed in Fig. 4. By reason of the above described disposition of the braces 23, the load applied to the drawbar 14 through the draw bolt 20 is taken by the draft arms 4 of the tractor mechanism through the stiff braces 23, that are rigid with the drawbar itself. Furthermore, the downward pull of the load on the drawbar is taken by the levers 12 which, as previously pointed out, form part of the hydraulically controlled draft mechanism.

By reason of the stiffness of the braces 23, and the fact that the draft arms 4 are held in their raised position by the lift arms 7, the drawbar 14 is always maintained in a substantially vertical position in contact with the housing 2, so that the point of draft is always well beside and close to the axle 6. Thus no matter how heavy the pull on the vehicle, or implement, coupled to the drawbar 14, there is no tendency to lift the front end of the tractor, as often occurs when a heavy load is applied at a considerable distance away from the rear axle.

From the foregoing, it is apparent that by the present invention there is provided an improved drawbar construction for use in connection with farm tractors of a type in common use. This drawbar is of extremely simple one-piece construction, and can be quickly and conveniently applied to the draft mechanism of a tractor by merely connecting the top lug 16 to the drawbar between the spaced levers 12 forming part of the existing tractor draft mechanism. With the drawbar thus hung in vertical position, its attachment to the tractor is completed by connecting the ends of the stiff braces 23 to the draft arms 4.

I claim:

1. In combination with a tractor having a pair of laterally spaced draft members, and means for maintaining said draft members in a predetermined position with respect to the rear axle housing of said tractor, of a drawbar suspended at its upper end from a fixed point of said axle housing and providing a draft receiving portion at its lower end beside said housing, said drawbar being provided with spaced rigid arms extending rearwardly and pivotally connected at their ends to the ends of said draft members.

2. In combination with a tractor having a pair of laterally spaced draft members, and means for maintaining said draft members in a predetermined position with respect to the rear axle housing of said tractor, of a drawbar consisting of a substantially vertical body portion suspended at its upper end from a fixed point on the said axle housing and terminating at its lower end in a draft receiving portion, with said body portion providing a pair of stiff arms extending backwardly and inclined upwardly from said draft receiving portion for connection to the ends of said draft members.

3. In combination with a tractor having a differential housing, a draft member secured at each side of said housing, means for maintaining each of said draft members in a predetermined position relative to said housing, and a relatively short crank lever secured upon the top portion of said housing, of a drawbar consisting of a substantially vertical body disposed adjacent said housing and having a draft receiving portion at its lower end, a pair of laterally spaced arms each being rigidly secured at the lower portion of said vertical body and extending rearwardly and upwardly from said body for connection to the end portion of a respective one of said draft members, and means for securing the upper end of said vertical body directly to said crank lever thereby to retain said body in a substantially fixed position relative to said housing.

WILLIAM A. GREENE.

REFERENCES CITED

The following references are of record in the file of this patent:

UNITED STATES PATENTS

| Number | Name | Date |
|---|---|---|
| 2,320,141 | Kott | May 25, 1943 |
| 2,341,807 | Olmstead et al. | Feb. 15, 1944 |
| 2,375,970 | Williams | May 15, 1945 |